UNITED STATES PATENT OFFICE 2,115,780

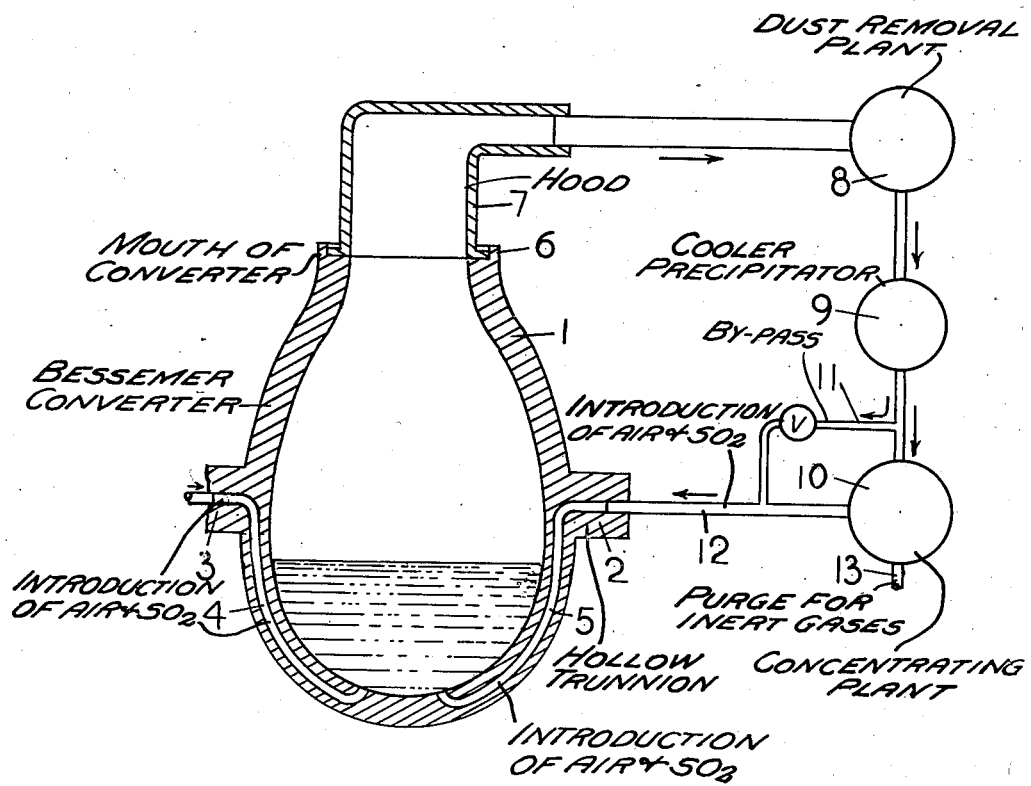

TREATMENT OF METALLIC SULPHIDES TO RECOVER SULPHUR AND METALLIC OXIDES THEREFROM

Ivan Roy McHaffie, Montreal, Quebec, Canada, and Daniel Tyrer, Norton-on-Tees, England, assignors to Imperial Chemical Industries Limited, a corporation of Great Britain Application September 13, 1934, Serial No. 743,898
In Great Britain September 13, 1933

6 Claims. (Cl. 23—226)

This invention has for its object the treatment of sulphide ores or minerals containing chiefly iron sulphide for the recovery of sulphur in the free state and for the extraction of valuable non-ferrous metals if they are present, by means of gases containing sulphur dioxide. The invention is especially applicable to the treatment of ores containing iron sulphide principally and non-ferrous metallic values such as copper and nickel.

Previous attempts at such a treatment have not resulted in a commercial process owing to an unsatisfactory degree of conversion.

We have now found that a rapid reaction between iron sulphide and sulphur dioxide takes place by treating the ore or mineral in molten form with gases containing sulphur dioxide at temperatures of about 1200–1500° C. The ferrous oxide formed is removed in the form of a slag according to usual metallurgical practice.

The process may be carried out in a Bessemer converter of either the barrel or upright type, a blast furnace, or even in a rotary kiln. As applied to the Bessemerizing of copper matte the invention consists in blowing a molten charge of matte with a mixture of an oxygen-containing gas and sulphur dioxide instead of air alone as in the normal practice.

In order to obtain as effective a reaction as possible, the sulphur dioxide should be passed through the molten charge at such a rate that the effluent gases contain a minimum of sulphur dioxide. These gases may be treated for the recovery of the free sulphur and the residual sulphur dioxide, or part thereof, recirculated for further use in the process. It is desirable to keep the quantity of inert gases, such as nitrogen, as low as possible as they not only slow down the reaction but also take up valuable heat. The sulphur-dioxide containing gases which are introduced with the blast should contain not more than about 20% of inert gases such as nitrogen.

The temperature of the melt may be maintained by pre-heating the inlet gases or by introducing oxygen as well as sulphur dioxide, or by a combination of both of these methods.

The oxygen-containing gas is preferably introduced together with the sulphur dioxide and the inlet gases are preferably pre-heated with the aid of the sensible heat of the effluent gases.

When the sulphur dioxide in the effluent gases is recirculated, it must be separated at least in part from inert gases. This concentration of sulphur dioxide may be effected in any suitable manner, e. g., by liquefaction or by absorption in a suitable solvent followed by regeneration, and the concentration plant employed provides a convenient means for simultaneously effecting a purge of nitrogen from the system at a rate equivalent to that at which nitrogen is introduced with the air.

The proportion of sulphur obtained in relation to sulphur dioxide may be varied by the addition of suitable amounts of carbonaceous reducing material with the reaction charge.

The process of the present invention can be applied to minerals and ores containing sulphides of the nature of pyrites which do not melt as such, but which on heating lose free sulphur with the formation of a lower and fusible sulphide. In this case additional heat must be provided to effect the distillation of the labile sulphur, and this may be supplied externally or by the introduction of increased quantities or air or oxygen.

In one form of our invention a blast furnace or rotary kiln, the upper end of which is enclosed, is fed with iron sulphide and a suitable flux such as silica, and any desired proportion of carbonaceous reducing agent. A mixture of sulphur dioxide and air is admitted at or near the base of the furnace and the exit gases consisting essentially of sulphur dioxide, carbon dioxide, and nitrogen, are withdrawn at or near the top and led to coolers. The inlet gases are pre-heated by interchange with the hot material leaving the reaction zone of the furnace. The sulphur is separated on cooling and sufficient of the residual gas is treated by a process of concentration to recover therefrom the requisite amount of enriched sulphur dioxide for mixing with the necessary oxygen-containing gas introduced into the furnace. The concentration is preferably carried out by absorption in a suitable solvent and regeneration by heating.

In a preferred form of the invention, a suitably lined converter is charged with molten metal sulphides, e. g., a copper matte, together with the required amount of silica to slag off the ferrous oxide formed. The converter is blown with sulphur dioxide to which is added sufficient air to maintain a suitable reaction temperature. The exit gases are treated as described above for the recovery of free sulphur and the concentration and recirculation of the requisite amount of sulphur dioxide.

A suitable plant is shown diagrammatically in Figure 1. Reference numeral 1 denotes a Bessemer converter mounted on the usual hollow trunnions 2. During the blowing of a charge the mouth 6 of the converter is closed by a hood 7, a suitable sand seal being provided at the junction. A mixture of air and sulphur dioxide supplied to the tuyères through pipes 4 is blown through the charge. The exit gases pass to a dust removal plant 8 and thence to a cooler 9 where the free sulphur is precipitated. A preheater is also provided to exchange the heat of the effluent gases and of the incoming sulphur dioxide and air. After leaving the precipitation plant 9, the gases are divided into two streams, one passing to the concentration plant 10 to provide at least the necessary sulphur dioxide for return to the furnace, and the other containing surplus sulphur dioxide being by-passed. Inert gases such as nitrogen are purged at 13. Surplus sulphur dioxide is also withdrawn as necessary from the concentration plant 10.

EXAMPLE 1

A mixture of air and sulphur dioxide pre-heated to 500° C. is blown through molten ferrous sulphide at a temperature of 1400° C. Silica is added from time to time to form a fluid slag with the oxidized iron. The gas leaving the converter contains free sulphur vapour, nitrogen and sulphur dioxide. This is cooled to condense the sulphur and part or all the residual gas is concentrated to produce pure sulphur dioxide which is added to the air passing to the converter. In order to meet the heat requirements of the process it is essential that not all the sulphur dioxide first formed, by the oxidation of ferrous sulphide to ferrous oxide and sulphur dioxide, is reduced by ferrous sulphide, but there must be a surplus production of sulphur dioxide. This surplus production may be reduced by carbon in a separate plant or otherwise disposed of, or, if desired, coke may be added to the reaction mass and the surplus sulphur dioxide thereby reduced in situ to free sulphur.

The gas quantities to make one metric ton of sulphur (without reference to any sulphur produced from surplus sulphur dioxide) are as follows:—

*Inlet gas preheated to 500° C.*

|  | Cu. M. |
|---|---|
| Air | 4170 |
| $SO_2$ | 260 |

*Exit gas at 1400° C.*

|  | Cu. M. |
|---|---|
| $N_2$ | 3300 |
| $SO_2$ | 593 |
| $S_2$ | 375 |

|  | Cu. M. |
|---|---|
| Surplus $SO_2$ produced | 333 |

The gas quantities are measured at the ordinary temperature and pressure.

EXAMPLE 2

A mixture of oxygen and $SO_2$ is blown through molten FeS at a temperature of 1300° C. Silica is added from time to time to form a fluid slag with the oxidized iron. The gas leaving the reaction vessel or converter contains free sulphur vapour and $SO_2$. This is cooled to condense the sulphur, and the remaining $SO_2$ is in part added to the oxygen fed to the reaction vessel. The surplus $SO_2$ which results from the use of oxygen in the blast to maintain the necessary temperature may be reduced by carbon in a separate plant or otherwise disposed of.

As an alternative coke may be added to the reaction mass and the surplus $SO_2$ thus reduced to free sulphur in situ.

The gas quantities to make 1 metric ton of sulphur (without reference to any sulphur produced from the surplus $SO_2$) are as follows:—

*Inlet gas*

|  | Cu. M. |
|---|---|
| Oxygen | 688 |
| $SO_2$ | 1047 |

*Exit gas at 1300° C.*

|  | Cu. M. |
|---|---|
| $SO_2$ | 1255 |
| $S_2$ | 375 |

|  | Cu. M. |
|---|---|
| Surplus $SO_2$ produced | 208 |

The gas quantities are measured at the ordinary temperature and pressure.

We claim:

1. In a process for the treatment of material containing iron sulphide for the recovery of sulphur and any non-ferrous metal contained therein, the steps of blowing into a molten bath of said material at a temperature of 1200–1500° C. sulphur dioxide and an oxygen-containing gas in proportion to maintain said material molten and at a temperature of 1200–1500° C. under such conditions that the residual gases contain sulphur dioxide in excess of the sulphur dioxide blown into the molten bath and a substantial amount of free sulphur, adding to said molten bath sufficient flux to form a fluid slag with the oxide of iron formed and to produce a molten bath sufficiently fluid for operation within the temperature range of 1200–1500° C., treating said residual gases to recover free sulphur and recirculating at least a part of the residual sulphur dioxide.

2. The process of claim 1 in which carbonaceous material is added to the molten bath to reduce the amount of the excess of sulphur dioxide in the residual gases.

3. In a process for the treatment of material containing iron sulphide for the recovery of sulphur the steps comprising blowing a molten charge of said material in a converter while at a temperature of 1200–1500° C. with a sulphur dioxide gas containing at least 80% sulphur dioxide to convert iron sulphide to iron oxide and to liberate a substantial quantity of free sulphur, simultaneously therewith burning a sufficient quantity of said charge with an oxygen containing gas to maintain the temperature at 1200–1500° C., the amount of sulphur dioxide and the amount of oxygen blown into said charge being in proportions such that surplus sulphur dioxide is produced and such that the effluent gas contains free sulphur vapor by volume in excess of the surplus sulphur dioxide, adding sufficient flux to form a fluid slag with the iron oxide formed and to maintain said charge sufficiently fluid for blowing at 1200–1500° C., and treating the effluent gas to recover the free sulphur.

4. The process of claim 3 in which preheated gas is employed to blow the charge.

5. The process of claim 3 in which the surplus sulphur dioxide is reduced by carbonaceous material.

6. The process of claim 3 in which at least a portion of the effluent gas is treated to concentrate the sulphur dioxide therein to at least 80% and recirculated for further use in the process.

IVAN ROY McHAFFIE.
DANIEL TYRER.